(12) United States Patent
Mori et al.

(10) Patent No.: US 10,711,879 B2
(45) Date of Patent: Jul. 14, 2020

(54) RING GEAR AND METHOD FOR MANUFACTURING RING GEAR

(71) Applicant: AISIN AW CO., LTD., Anjo-shi, Aichi-ken (JP)

(72) Inventors: Atsushi Mori, Anjo (JP); Katsuhiro Maeno, Anjo (JP); Naoki Takabayashi, Nishio (JP); Kiyoshi Tajima, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/328,459

(22) PCT Filed: Sep. 22, 2017

(86) PCT No.: PCT/JP2017/034353
§ 371 (c)(1),
(2) Date: Feb. 26, 2019

(87) PCT Pub. No.: WO2018/062045
PCT Pub. Date: Apr. 5, 2018

(65) Prior Publication Data
US 2019/0331210 A1  Oct. 31, 2019

(30) Foreign Application Priority Data

Sep. 29, 2016  (JP) .................. 2016-191778

(51) Int. Cl.
*F16H 57/08* (2006.01)
*F16H 1/28* (2006.01)
(Continued)

(52) U.S. Cl.
CPC ............... *F16H 57/08* (2013.01); *F16H 1/28* (2013.01); *F16C 3/02* (2013.01); *F16H 48/22* (2013.01);
(Continued)

(58) Field of Classification Search
None
See application file for complete search history.

(56) References Cited

U.S. PATENT DOCUMENTS 9,951,860 B2 * 4/2018 McCune ............... F01D 5/027
2004/0033859 A1 2/2004 Yoshihama et al.
(Continued)

FOREIGN PATENT DOCUMENTS

JP  S48-50161 A  7/1973
JP  H04-285346 A  10/1992
(Continued)

OTHER PUBLICATIONS

Dec. 5, 2017 International Search Report issued in International Patent Application No. PCT/JP2017/034353.

*Primary Examiner* — Colby M Hansen
(74) *Attorney, Agent, or Firm* — Oliff PLC

(57) ABSTRACT

A ring gear that, together with a sun gear and a pinion gear that is disposed radially outward of the sun gear and meshes with the sun gear, forms a planetary gear unit, the ring gear includes: a body, internal teeth that are configured to mesh with the pinion gear and that are formed in at least a part of an inner peripheral surface of the body, and external teeth that have a lower hardness than the internal teeth and that are formed in at least a part of an outer peripheral surface of the body, wherein a surface nitrogen concentration in the internal teeth is higher than that in at least tooth surfaces of the external teeth.

5 Claims, 3 Drawing Sheets

(51) Int. Cl.
*F16C 3/02* (2006.01)
*F16H 48/22* (2006.01)
*F16H 1/32* (2006.01)
*F16H 55/17* (2006.01)

(52) U.S. Cl.
CPC .. *F16H 2001/327* (2013.01); *F16H 2055/176* (2013.01)

(56) References Cited

U.S. PATENT DOCUMENTS

2012/0267010 A1* 10/2012 Obayashi ........... B23K 15/0033
  148/211
2017/0045136 A1* 2/2017 Taga ..................... F16C 33/122

FOREIGN PATENT DOCUMENTS

JP  2004-076858 A  3/2004
JP  4867430 B2  2/2012

* cited by examiner

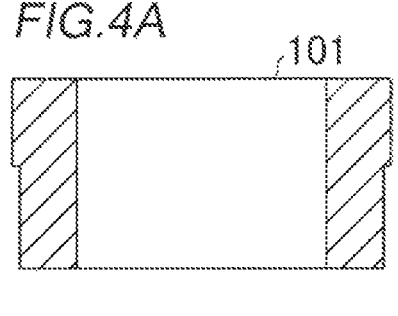
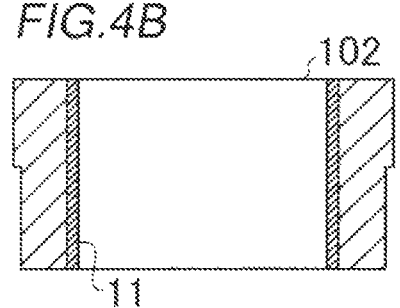
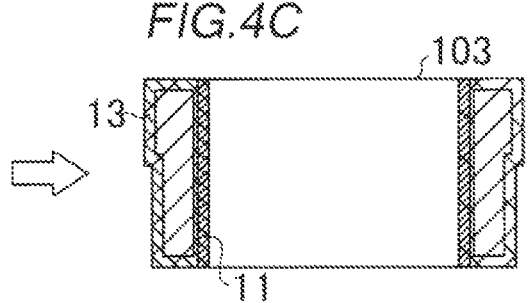
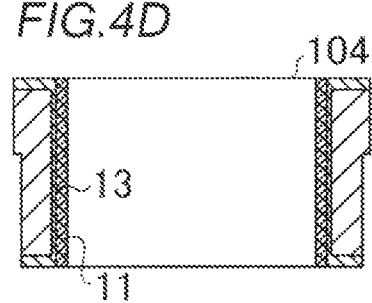
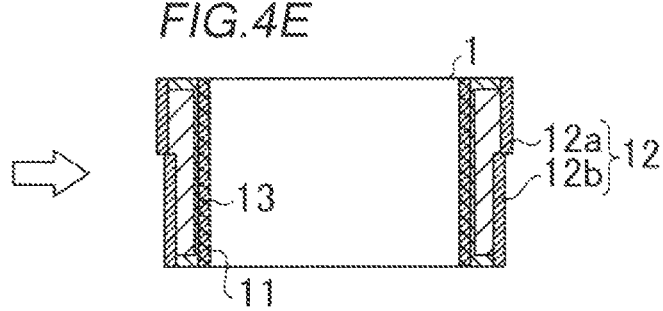

RING GEAR AND METHOD FOR MANUFACTURING RING GEAR

BACKGROUND

The present disclosure relates to ring gears and methods for manufacturing a ring gear.

Conventionally, planetary gear units including a ring gear, which are used for automatic transmissions for vehicles etc., are known in the art. For example, Japanese Patent Application Publication No. H04-285346 (JP H04-285346 A) discloses such a planetary gear unit.

Japanese Patent Application Publication No. H04-285346 (JP H04-285346 A) discloses a planetary gear unit for use in automatic transmissions for vehicles, which includes a ring gear, a pinion gear that meshes with internal teeth of the ring gear, and a sun gear that is disposed inward of the pinon gear and meshes with the pinion gear. Since the internal teeth of the ring gear are required to have predetermined hardness, the internal teeth of the ring gear in the planetary gear unit of Japanese Patent Application Publication No. H04-285346 (JP H04-285346 A) have been subjected to nitrocarburizing in order to improve hardness of the internal teeth. Induction hardening may be used to increase hardness of the internal teeth. However, since the processing temperature of nitrocarburizing is lower than that of induction hardening, distortion due to nitrocarburizing is restrained and the internal teeth can be formed with high accuracy. Gear noise that is generated by meshing between the pinion gear and the internal teeth of the ring gear is therefore reduced as compared to induction hardening.

In a planetary gear unit disclosed in Japanese Patent No. 4,867,430, a clutch that is a friction engagement element is disposed radially outward of a ring gear. The clutch includes outer thin plates (clutch plates) 43 that are first friction materials, inner thin plates (clutch discs) 44 that are second friction materials, etc., and splines formed in the outer peripheral surface of the ring gear R1 are engaged with splines formed in the inner peripheral surface of the clutch discs 44. The ring gear R1 is thus configured to serve also as a hub of a clutch Ca. Similarly, a ring gear R2 also serves as a hub of a clutch Cb.

SUMMARY

However, in the case where such a conventional ring gear having internal teeth and external teeth as described in Japanese Patent No. 4,867,430 is subjected to nitrocarburizing described in Japanese Patent Application Publication No. H04-285346 (JP H04-285346 A), hardness of both the internal teeth and the external teeth is increased by nitrocarburizing because the ring gear is placed in a furnace during nitrocarburizing. As this time, surface hardness of the external teeth of the ring gear is significantly increased by nitrocarburizing to a value higher than surface hardness of the clutch discs that mesh with the external teeth. This is disadvantageous in that the clutch discs tend to wear due to contact with the external teeth of the ring gear. Accordingly, it is difficult to restrain wear of a member that meshes with the external teeth. In the case of automatic transmissions for vehicles, if the clutch discs wear and the wear of the clutch discs progresses, not only gear noise may be generated but also a shift shock may occur.

An exemplary aspect of the disclosure provides a ring gear whose internal teeth can be formed with high hardness and with high accuracy and which restrains wear of a member that meshes with external teeth, and a method for manufacturing such a ring gear.

A ring gear according to a first aspect of the present disclosure is a ring gear that, together with a sun gear and a pinion gear that is disposed radially outward of the sun gear and meshes with the sun gear, forms a planetary gear unit, the ring gear including a body, internal teeth that are configured to mesh with the pinion gear and that are formed in at least a part of an inner peripheral surface of the body, and external teeth that have a lower hardness than the internal teeth and that are formed in at least a part of an outer peripheral surface of the body, wherein and surface nitrogen concentration in the internal teeth is higher than that in at least tooth surfaces of the external teeth.

In the ring gear according to the first aspect of the present disclosure, as described above, the ring gear is formed so that the surface nitrogen concentration in the internal teeth is higher than that in at least the tooth surfaces of the external teeth. Accordingly, in the internal teeth, a nitride layer is formed at surfaces of the internal teeth, whereby the internal teeth can be formed with high hardness. Since the nitride layer is formed by nitriding at a lower processing temperature than induction hardening, distortion due to nitriding is restrained and the internal teeth can be formed with high accuracy. This allows the internal teeth to have sufficient wear resistance and reduces gear noise that is generated as a gear meshes with an inner periphery of the ring gear. In the external teeth, hardness of the external teeth can be reduced as compared to the case where the nitride layer is present at surfaces of the external teeth. This restrains wear of a member that meshes with the external teeth.

A method for manufacturing a ring gear according to a second aspect of the present disclosure is a method for manufacturing a ring gear having internal teeth in an inner peripheral surface and external teeth in an outer peripheral surface from an annular raw blank, including the steps of: forming an intermediate body by forming the internal teeth in an inner peripheral surface of the annular raw blank; forming a nitride layer at a surface of the intermediate body by nitriding an entirety of the intermediate body; removing the nitride layer formed in a part of an outer peripheral surface of the intermediate body resulting from the nitriding, which is a part where formation of the external teeth is desired; and forming the external teeth in a part of the intermediate body from which the nitride layer has been removed and where formation of the external teeth is desired.

In the method for manufacturing a ring gear according to the second aspect of the present disclosure, as described above, the nitride layer is formed at surfaces of the internal teeth by nitriding, and the nitride layer at surfaces of the external teeth is removed. Accordingly, in the internal teeth, the nitride layer is formed at the surfaces of the internal teeth, whereby the internal teeth can be formed with high hardness. Since the nitride layer is formed by nitriding at a lower processing temperature than induction hardening, distortion due to nitriding is restrained and the internal teeth can be formed with high accuracy. This allows the internal teeth to have sufficient wear resistance and reduces gear noise that is generated as a gear meshes with an inner periphery of the ring gear. In the external teeth, hardness of the external teeth can be reduced as compared to the case where the nitride layer is present at the surfaces of the external teeth. This restrains wear of a member that meshes with the external teeth.

According to the present disclosure, as described above, internal teeth are formed with high hardness and with high accuracy, and wear of a member that meshes with external teeth is restrained.

BRIEF DESCRIPTION OF THE DRAWINGS

FIG. 4 shows views illustrating a method for manufacturing a ring gear according to the embodiment of the present disclosure.

DETAILED DESCRIPTION OF EMBODIMENTS

Figure 1:
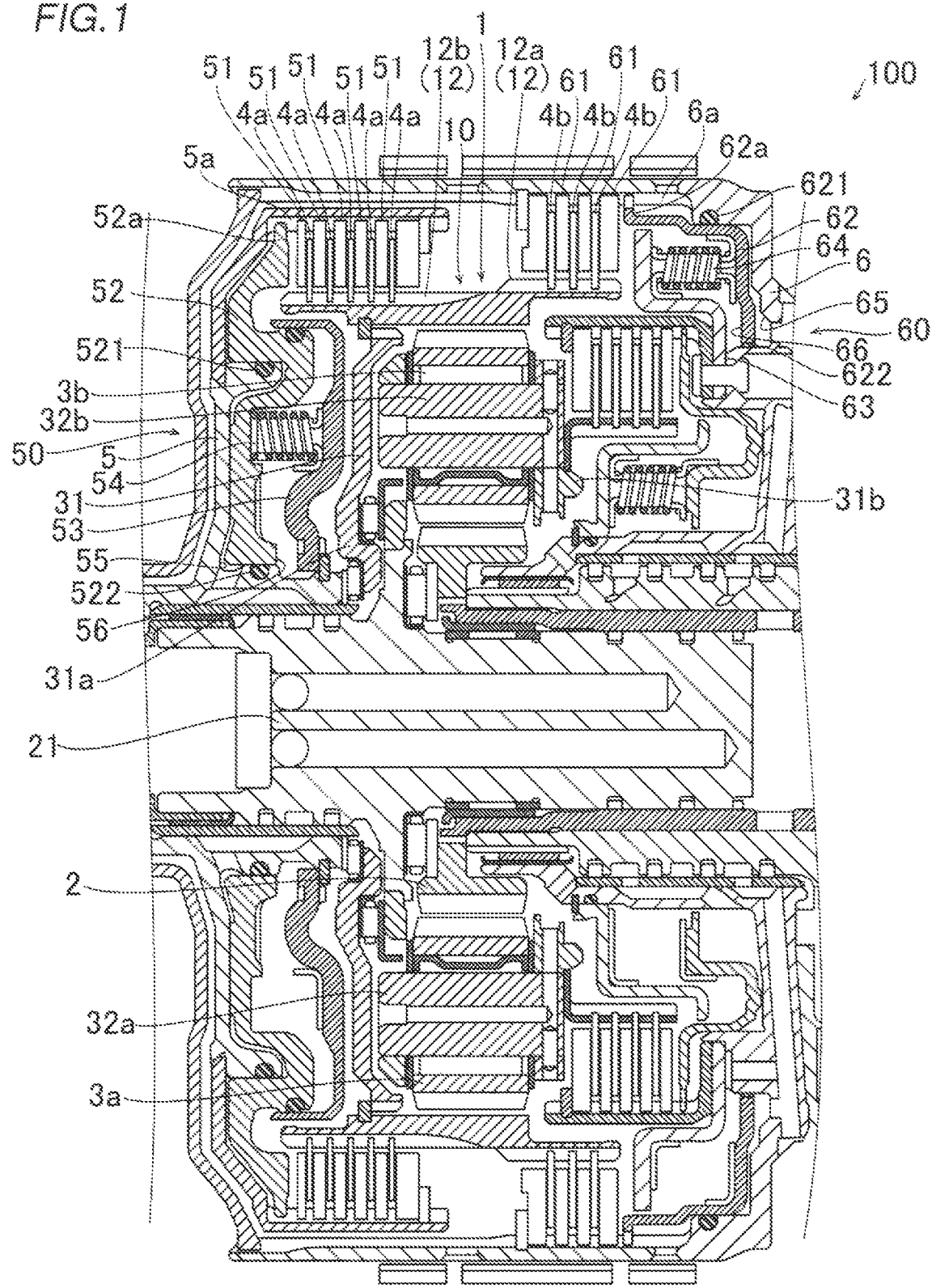
FIG. 1 is a sectional view schematically showing a planetary gear unit including a ring gear according to an embodiment of the present disclosure.

An embodiment of the present disclosure will be described with reference to the accompanying drawings.

A planetary gear unit according to an embodiment of the present disclosure will be described with reference to FIGS. 1 to 3.

A planetary gear unit 100 is configured to be used as a part for automatic transmissions of vehicles. For example, the planetary gear unit 100 is configured to be used for automatic transmissions of automobiles. As shown in FIG. 1, the planetary gear unit 100 includes a ring gear 1, a sun gear 2, and pinion gears 3a, 3b. The ring gear 1 is configured so that clutch discs 4a, 4b mesh with its outer periphery. The planetary gear unit 100 includes a double-pinion planetary gear including the pinion gears 3a, 3b.

As shown in FIG. 1, the sun gear 2 is disposed radially inward of the ring gear 1. The sun gear 2 is configured to mesh with a plurality of the pinion gears 3a disposed radially outward of the sun gear 2. That is, the sun gear 2 is disposed approximately in the center of the ring gear 1 in the radial direction. The sun gear 2 is also disposed approximately in the middle of the plurality of pinion gears 3a. The sun gear 2 is rotatable about a rotary shaft 21.

The pinion gears 3a, 3b are disposed radially inward of the ring gear 1. The pinion gears 3a, 3b are disposed radially outward of the sun gear 2. That is, the pinion gears 3a, 3b are disposed between the sun gear 2 and the ring gear 1. The pinion gear 3a is configured to mesh with the sun gear 2 and the pinion gear 3b. The pinion gear 3b is configured to mesh with the pinion gear 3a and the ring gear 1. A plurality of the pinion gears 3b are coupled by a carrier 31. The pinion gear 3a is rotatable about a rotary shaft 32a. The pinion gear 3b is rotatable about a rotary shaft 32b. The plurality of pinion gears 3a, 3b are rotatable relative to the sun gear 2 around the sun gear 2.

The carrier 31 has a carrier plate 31a and a carrier plate 31b, and the carrier plates 31a, 31b support the rotary shafts 32a, 32b. The rotary shaft 32a rotatably supports the pinion gear 3a, and the rotary shaft 32b rotatably supports the pinion gear 3b.

The clutch discs 4a, 4b are disposed radially outward of the ring gear 1. A plurality of the clutch discs 4a, 4b are provided in the direction of the axis of rotation of the ring gear 1. Specifically, the plurality of clutch discs 4a are arranged on one side of the ring gear 1 in the axial direction. The plurality of clutch discs 4b are arranged on the other side of the ring gear 1 in the axial direction. A clutch hub 10 is formed integrally on the outer periphery of the ring gear 1. The clutch hub 10 has splines (external teeth) formed in its outer peripheral surface. The clutch discs 4a, 4b are engaged with the splines of the clutch hub 10. The clutch discs 4a are engaged with external teeth 12b of the ring gear 1 with tooth surfaces of the clutch discs 4a in contact with tooth surfaces of the external teeth 12b of the ring gear 1. The clutch discs 4b are engaged with external teeth 12a of the ring gear 1 with tooth surfaces of the clutch discs 4b in contact with tooth surfaces of the external teeth 12a of the ring gear 1.

Figure 3:
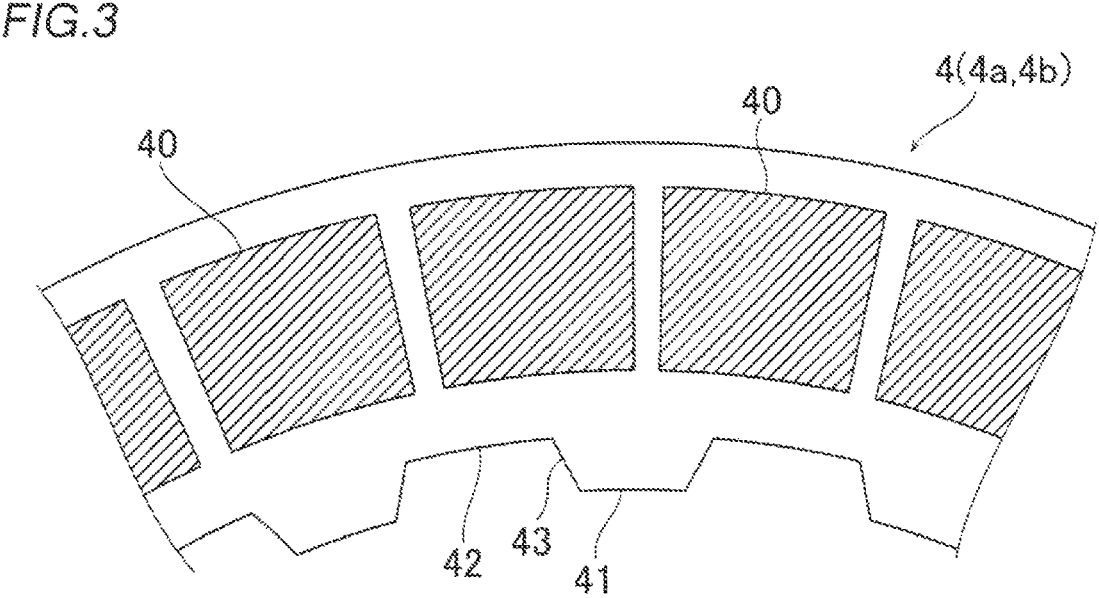
FIG. 3 is a view showing a part of a clutch disc according to the embodiment of the present disclosure.

As shown in FIG. 3, each clutch disc 4a, 4b has a plurality of teeth formed in its inner periphery and including top lands 41, bottom lands 42, and tooth surfaces 43. Each clutch disc 4a, 4b has a plurality of friction materials 40 bonded to its surface.

A hydraulic servo 50 has a clutch drum 5, a piston member 52, a cancel plate 53, and a return spring 54, and these components form a hydraulic oil chamber 55 and a cancel oil chamber 56.

The clutch drum 5 is located radially outward of the ring gear 1, and a clutch plates 51 are engaged with splines formed in the inner peripheral surface of a drum portion 5a of the clutch drum 5. The plurality of the clutch plates 51 are provided so as to face the plurality of clutch discs 4a. That is, the clutch plates 51 and the clutch discs 4a are alternately arranged along the axis of rotation.

The piston member 52 together with the clutch drum 5 forms the oiltight hydraulic oil chamber 55 therebetween which is sealed by a seal ring 521 and a sealing member 522. The piston member 52 has an extended pressing portion 52a in its outer periphery. The pressing portion 52a is disposed such that its front end faces the leftmost clutch plate 51 in FIG. 1.

The return spring 54 is disposed in a compressed state between the cancel plate 53 and the piston member 52. The cancel plate 53, the piston member 52, and a sealing member disposed on the outer peripheral portion of the piston member 52 form the oiltight cancel oil chamber 56.

With the above configuration, the piston member 52 is moved in the axial direction by the balance between oil pressures produced in the hydraulic oil chamber 55 and the cancel oil chamber 56, so that the clutch plates 51 and the clutch discs 4a are pressed against or separated from each other. A clutch is thus engaged or disengaged.

A hydraulic servo 60 has a clutch drum 6, a piston member 62, a cancel plate 63, and a return spring 64, and these components form a hydraulic oil chamber 65 and a cancel oil chamber 66.

The clutch drum 6 is located radially outward of the ring gear 1, and a clutch plates 61 are engaged with splines formed in the inner peripheral surface of a drum portion 6a of the clutch drum 6. The plurality of the clutch plates 61 are provided so as to face the plurality of clutch discs 4b. That is, the clutch plates 61 and the clutch discs 4b are alternately arranged along the axis of rotation.

The piston member 62 together with the clutch drum 6 forms the oiltight hydraulic oil chamber 65 therebetween which is sealed by a seal ring 621 and a sealing member 622. The piston member 62 has an extended pressing portion 62a in its outer periphery. The pressing portion 62a is disposed such that its front end faces the rightmost clutch plate 61 in FIG. 1.

The return spring 64 is disposed in a compressed state between the cancel plate 63 and the piston member 62. The cancel plate 63, the piston member 62, and a sealing member disposed on the outer peripheral portion of the piston member 62 form the oiltight cancel oil chamber 66.

With the above configuration, the piston member 62 is moved in the axial direction by the balance between oil pressures produced in the hydraulic oil chamber 65 and the cancel oil chamber 66, so that the clutch plates 61 and the clutch discs 4b are pressed against or separated from each other. A clutch is thus engaged or disengaged.

Figure 2:
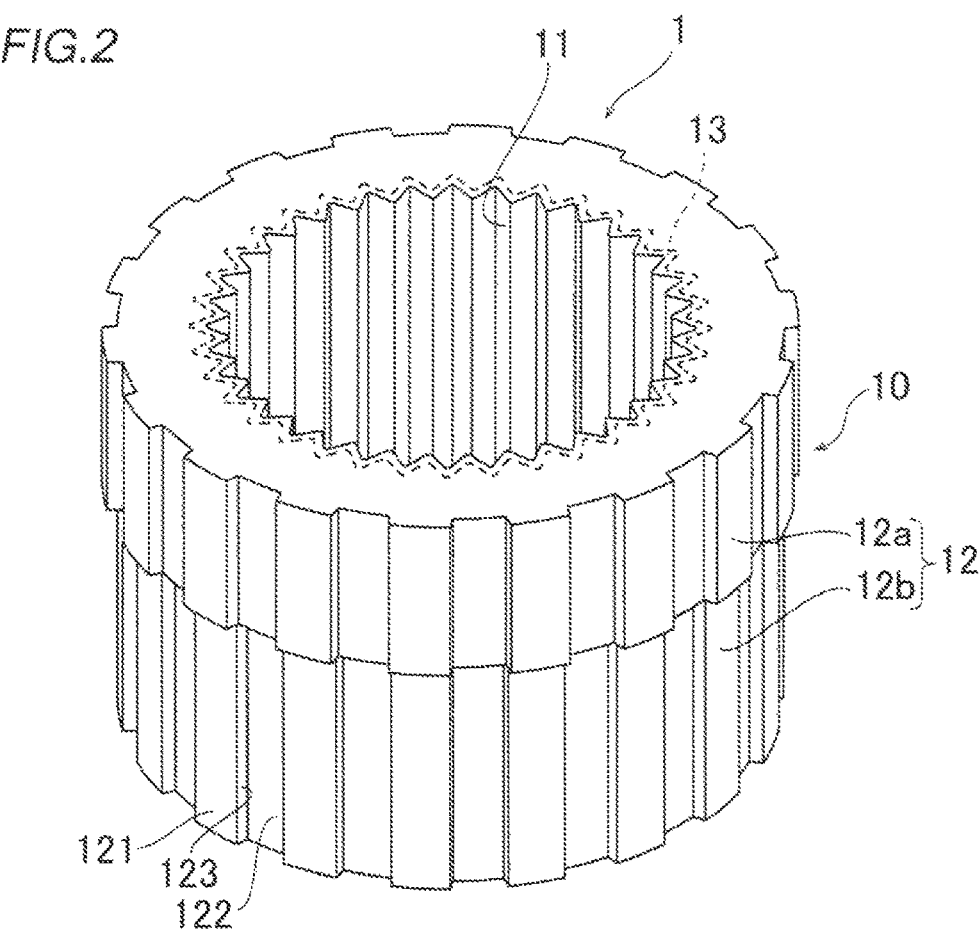
FIG. 2 is a perspective view of the ring gear according to the embodiment of the present disclosure.

As shown in FIG. 2, the ring gear 1 includes internal teeth 11 and external teeth 12. The external teeth 12 are formed in two tiers and have the external teeth 12a and the external teeth 12b. The ring gear 1 is disposed radially outward of the sun gear 2. That is, the ring gear 1, together with the sun gear 2, the pinion gears 3a disposed radially outward of the sun gear 2 and meshing with the sun gear 2, and the pinion gears 3b disposed radially outward of the pinion gears 3a and meshing with the pinion gears 3a, forms the planetary gear unit 100. The ring gear 1 meshes with the pinion gears 3b by the internal teeth 11.

As shown in FIG. 1, the ring gear 1 is configured so that its radially outer portion meshes with the plurality of clutch discs 4a, 4b. That is, the ring gear 1 is configured to be used as the clutch hub 10. The ring gear 1 is also configured so that its radially inner portion meshes with the plurality of pinion gears 3b.

The ring gear 1 is formed in an annular shape. A steel material is used as a base material for the ring gear 1. For example, the steel material that is used as the base material contains iron and carbon as elements. The base material may further contain silicon, manganese, phosphorus, sulfur, chromium, aluminum, nitrogen, etc. as elements as necessary.

As shown in FIG. 2, the internal teeth 11 are formed in the inner periphery of the ring gear 1. The internal teeth 11 are configured to mesh with the pinion gears 3b. In the present embodiment, a nitride layer 13 is formed at the surfaces of the internal teeth 11 by nitriding the base material of the ring gear 1. Specifically, the nitride layer 13 having a higher nitrogen concentration than the base material is formed at the surfaces of the internal teeth 11 by nitriding the base material of the ring gear 1.

As shown in FIG. 2, the external teeth 12 are formed in the outer periphery of the ring gear 1. The external teeth 12 include top lands 121, bottom lands 122, and tooth surfaces 123 and are configured so that the clutch discs 4a, 4b disposed radially outward of the ring gear 1 mesh with the external teeth 12. In the present embodiment, the base material of the ring gear 1 is exposed at the surfaces of the external teeth 12. That is, no nitride layer 13 is present in at least the tooth surfaces 123 out of the surfaces of the external teeth 12. Specifically, the surface nitrogen concentration in at least the tooth surfaces 123 of the external teeth 12 is the nitrogen concentration of the base material.

The nitride layer 13 is formed by introducing nitrogen into the base material located near the surface of the ring gear 1. Specifically, the nitride layer 13 is formed by gas nitrocarburizing. The nitride layer 13 is harder than the base material of the ring gear 1. For example, the base material has Vickers hardness of about 250 HV. The nitride layer 13 has Vickers hardness of about 600 HV or more and about 900 HV or less. That is, the hardness of the nitride layer 13 is twice or more that of the base material.

(Manufacturing Method of Ring Gear)

Next, a method for manufacturing the ring gear 1 will be described with reference to FIGS. 4A to 4E.

First, as shown in FIG. 4A, a raw blank 101 for the ring gear 1 is formed by hot forging from a steel material (base material) for forming the ring gear 1. Specifically, the base material is formed into an annular shape. The inside diameter of the annular shape is adjusted in view of a machining allowance for forming internal teeth 11. The outside diameter of the annular shape is also adjusted in view of a machining allowance for cutting away a nitride layer 13 that is to be formed later and a machining allowance for forming external teeth 12. The inside diameter and the outside diameter of the raw blank 101 and the end faces of both ends in the direction of the axis of rotation of the raw blank 101 are also adjusted as necessary.

Next, as shown in FIG. 4B, the internal teeth 11 are formed in the inner periphery of the raw blank 101 to produce an intermediate body 102. The internal teeth 11 are formed by, e.g., broaching and chamfering of tooth ends. As shown in FIG. 4C, the intermediate body 102 is then nitrided to produce an intermediate body 103. The intermediate body 103 thus has the nitride layer 13 at its surface. This nitriding is performed by gas nitrocarburizing.

Then, as shown in FIG. 4D, the nitride layer 13 in the outer periphery of the intermediate body 103 resulting from the nitriding is removed to produce an intermediate body 104. At this time, the nitride layer 13 is removed until the base material in the outer periphery of the intermediate body 103 is exposed. That is, the nitride layer 13 formed in a part of the outer peripheral surface of the intermediate body 103 resulting from the nitriding, namely in a part where formation of the external teeth 12 is desired, is removed. It is preferable that the outer peripheral surface of the intermediate body 103 be a cylindrical shape having a smooth surface that is even in the circumferential direction, because this facilitates removal of the nitride layer 13 formed in the outer periphery by turning.

Subsequently, as shown in FIG. 4E, the external teeth 12 are formed in the outer periphery of the intermediate body 104 from which the nitride layer 13 has been removed, thereby producing the ring gear 1. That is, the external teeth 12 are formed in the outer periphery of the intermediate body 104 where the base material is exposed. Specifically, the external teeth 12 are formed in the part of the intermediate body 104 from which the nitride layer 13 has been removed, namely in the part where formation of the external teeth 12 is desired. The external teeth 12 are formed by, e.g., cutting with a hob cutter. Since there is no nitride layer 13 in the outer periphery of the intermediate body 104 and the intermediate body 104 thus has lower hardness in its outer periphery, the external teeth 12 can be easily formed in the outer periphery of the intermediate body 104. Thereafter, the ring gear 1 is deburred by shot blasting and cleaned as necessary. The ring gear 1 is manufactured in this manner.

In the present embodiment, as described above, the nitride layer 13 is formed at the surfaces of the internal teeth 11 by nitriding the base material for the ring gear 1, and the surfaces of the external teeth 12 are formed so that the base material is exposed. This allows the internal teeth 11 to have high hardness. Since the nitride layer 13 is formed by nitriding at a lower processing temperature than induction hardening, distortion due to nitriding is restrained and the internal teeth 11 can be formed with high accuracy. This allows the internal teeth 11 to have sufficient wear resistance and reduces gear noise that is generated as the pinion gears 3b mesh with the inner periphery of the ring gear 1. The surfaces of the external teeth 12 are formed so that the base material is exposed. This allows the external teeth 12 to have lower hardness than in the case where the nitride layer 13 is present at the surfaces of the external teeth 12. This restrains wear of the clutch discs 4a, 4b that mesh with the external teeth 12. The clutch discs 4a, 4b and the external teeth 12 of the ring gear 1 contact each other by the tooth surfaces of core plates forming the clutch discs 4a, 4b and the tooth surfaces of the external teeth 12 of the ring gear 1. It is therefore important to form the external teeth 12 of the ring gear 1 so that the base material is exposed at the surfaces of the tooth surfaces of the external teeth 12.

In the present embodiment, as described above, the external teeth 12 of the ring gear 1 are configured so that the clutch discs 4a, 4b disposed radially outward of the ring gear 1 mesh with the external teeth 12, and the nitride layer 13 is configured to be harder than the base material for the ring gear 1. Since the hardness of the external teeth 12 of the ring gear 1 which mesh with the clutch discs 4a, 4b can be made smaller than that of the nitride layer 13, wear of the clutch discs 4a, 4b is effectively restrained without increasing the hardness of the clutch discs 4a, 4b.

In the present embodiment, as described above, the nitride layer 13 in the outer periphery of the intermediate body 103 resulting from the nitriding is removed until the base material in the outer periphery of the ring gear 1 is exposed, and the external teeth 12 are formed in the outer periphery of the intermediate body 104 where the base material has been exposed. This allows the external teeth 12 of the ring gear 1 to be formed so as not to include the nitride layer 13 and thus more reliably restrains wear of the clutch discs 4a, 4b that mesh with the external teeth 12.

In the present embodiment, as described above, the nitride layer 13 of the intermediate body 103 is formed by gas nitrocarburizing. This allows the nitride layer 13 having a substantially uniform thickness to be formed in both the tooth surfaces (protruding portions) and the bottom lands (recessed portions) of the internal teeth 11.

In the present embodiment, as described above, the outer peripheral surface of the intermediate body 103 resulting from the nitriding is a smooth surface that is even in the circumferential direction. This facilitates removal of the nitride layer 13 in the outer peripheral surface of the intermediate body 103.

In the present embodiment, as described above, the outer periphery of the intermediate body 103 is formed into a smooth cylindrical shape that is even in the circumferential direction, and the nitride layer 13 in the outer periphery is removed by turning. The nitride layer 13 can thus be cut away by turning with a chip that is harder than a cutter, which facilitates removal of the nitride layer 13 in the outer periphery of the intermediate body 103.

Next, an example will be described in which the inventors actually formed the nitride layer 13 by nitriding the surface of the ring gear 1 by gas nitrocarburizing and measured the thicknesses of the nitride layer 13 at the tooth surfaces (protruding portions) and the bottom lands (recessed portions) in order to verify the effects of gas nitrocarburizing.

In this example, the intermediate body 102 was subjected to gas nitrocarburizing to form the nitride layer 13. This gas nitrocarburizing was performed at about 560° C. for two hours. The thickness of the nitride layer 13 at the tooth surfaces (protruding portions) of the ring gear 1 was 0.23 mm. The thickness of the nitride layer 13 at the bottom lands (recessed portions) of the ring gear 1 was 0.27 mm. This result shows that the nitride layer 13 having a substantially uniform thickness can be formed in both the tooth surfaces (protruding portions) and the bottom lands (recessed portions) by gas nitrocarburizing.

(Modifications)

The embodiment disclosed herein is merely by way of example in all respects and should not be construed as restrictive. The scope of the present disclosure is defined by the claims rather than by the above description of the embodiment and the example, and the disclosure is intended to cover all alterations (modifications) and equivalents which fall within the scope of the claims.

For example, the above embodiment shows an example in which the planetary gear unit of the present disclosure includes a double-pinion planetary gear. However, it should be understood that the planetary gear unit of the present disclosure may include a single-pinion planetary gear including only one type of pinion gears. In this case, a ring gear is located radially outward of a sun gear, and the planetary gear unit includes a plurality of pinion gears of the same type which mesh with both the sun gear and the ring gear. The above embodiment shows an example in which the planetary gear unit of the present disclosure is used as a part for automatic transmissions for vehicles. However, the present disclosure is not limited to this. The planetary gear unit of the present disclosure may be used in applications other than a part for automatic transmissions for vehicles.

The above embodiment shows an example in which the ring gear of the present disclosure is used for planetary gear units. However, the present disclosure is not limited to this. The ring gear of the present disclosure may be used in applications other than planetary gear units.

The above embodiment shows an example of the configuration in which the nitride layer is formed in the ring gear by gas nitrocarburizing. However, the present disclosure is not limited to this. In the present disclosure, the nitride layer may be formed in the ring gear by a process other than gas nitrocarburizing. For example, the nitride layer may be formed by salt bath nitriding.

The above embodiment shows an example of the configuration in which the nitride layer in the outer periphery of the ring gear is removed by turning. However, the present disclosure is not limited to this. In the present disclosure, the nitride layer in the outer periphery of the ring gear may be removed by a process other than turning. For example, the nitride layer in the outer periphery of the ring gear may be removed by cutting with an end mill, a cutter, etc.

The above embodiment shows an example of the configuration in which the clutch discs are disposed radially outward of the external teeth of the ring gear and mesh with the external teeth of the ring gear. However, the present disclosure is not limited to this. In the present disclosure, a gear other than the clutch discs may be disposed radially outward of the external teeth of the ring gear and mesh with the external teeth of the ring gear.

The above embodiment shows an example of the configuration in which the internal teeth are formed in the entire inner peripheral surface of the ring gear. However, the present disclosure is not limited to this. In the present disclosure, the internal teeth need only to be formed in at least a part of the inner peripheral surface of the ring gear. The area where the internal teeth are to be formed in the inner peripheral surface of the ring gear is determined by which part of the inner peripheral surface of the ring gear is desired to mesh with the pinion gears.

The above embodiment shows an example of the configuration in which the external teeth are formed in the entire outer peripheral surface of the ring gear. However, the present disclosure is not limited to this. In the present disclosure, the external teeth need only to be formed in at least a part of the outer peripheral surface of the ring gear. The area where the external teeth are to be formed in the outer peripheral surface of the ring gear is also determined by which part of the outer peripheral surface of the ring gear is desired to be used as a clutch hub. In the present embodiment, the outer peripheral surface of the ring gear is used as two types of hubs. However, the outer peripheral surface of the ring gear may be used as a single type of hub.

The above embodiment shows an example of the configuration in which the surface nitrogen concentration in the external teeth is the nitrogen concentration of the base material. However, the present disclosure is not limited to this. In the present disclosure, the surface nitrogen concentration in at least the tooth surfaces of the external teeth need only to be the nitrogen concentration of the base material. This is because the external teeth and the clutch discs contact each other by their tooth surfaces.

The invention claimed is:

1. A ring gear that, together with a sun gear and a pinion gear that is disposed radially outward of the sun gear and meshes with the sun gear, forms a planetary gear unit, the ring gear comprising:
    a body,
    internal teeth that are configured to mesh with the pinion gear and that are formed in at least a part of an inner peripheral surface of the body, and
    external teeth that have a lower hardness than the internal teeth and that are formed in at least a part of an outer peripheral surface of the body,
        wherein a surface nitrogen concentration in the internal teeth is higher than that in at least tooth surfaces of the external teeth.

2. The ring gear according to claim 1, wherein
    the external teeth are configured so that a clutch disc can be disposed radially outward of a ring gear mesh with the external teeth.

3. A method for manufacturing a ring gear having internal teeth in an inner peripheral surface and external teeth in a outer peripheral surface from an annular raw blank, comprising the steps of:
    forming an intermediate body by forming the internal teeth in an inner peripheral surface of the annular raw blank;
    forming a nitride layer at a surface of the intermediate body by nitriding an entirety of the intermediate body;
    removing the nitride layer formed in a part of an outer peripheral surface of the intermediate body resulting from the nitriding, which is a part where formation of the external teeth is desired; and
    forming the external teeth in a part of the intermediate body from which the nitride layer has been removed and where formation of the external teeth is desired.

4. The method for manufacturing a ring gear according to claim 3, wherein
    the outer peripheral surface of the intermediate body resulting from the nitriding is a smooth surface that is even in a circumferential direction.

5. The method for manufacturing a ring gear according to claim 3, wherein
    the nitride layer of the ring gear is formed by gas nitrocarburizing.

* * * * *